United States Patent
Sadakuni

(10) Patent No.: US 9,319,563 B1
(45) Date of Patent: Apr. 19, 2016

(54) IMAGE PROCESSING DEVICE AND METHOD FOR PROCESSING IMAGE DATA

(71) Applicants: KABUSHIKI KAISHA TOSHIBA, Tokyo (JP); TOSHIBA TEC KABUSHIKI KAISHA, Tokyo (JP)

(72) Inventor: Takayuki Sadakuni, Numazu Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/614,598

(22) Filed: Feb. 5, 2015

(51) Int. Cl.
| | | |
|---|---|---|
| G06F 3/12 | (2006.01) | |
| H04N 1/44 | (2006.01) | |
| G06F 12/14 | (2006.01) | |
| G06Q 10/10 | (2012.01) | |
| H04N 1/00 | (2006.01) | |
| H04N 1/21 | (2006.01) | |

(52) U.S. Cl.
CPC ............ *H04N 1/444* (2013.01); *G06F 12/1458* (2013.01); *G06Q 10/107* (2013.01); *H04N 1/00209* (2013.01); *H04N 1/00411* (2013.01); *H04N 1/00856* (2013.01); *H04N 1/2179* (2013.01); *G06F 2212/1052* (2013.01); *H04N 2201/0094* (2013.01)

(58) Field of Classification Search
None
See application file for complete search history.

(56) References Cited

U.S. PATENT DOCUMENTS

| 7,339,695 | B2 * | 3/2008 | Mitsubori | 358/1.15 |
|---|---|---|---|---|
| 7,533,151 | B2 * | 5/2009 | Takashima | 709/206 |
| 2003/0169449 | A1 * | 9/2003 | Iida | 358/1.15 |
| 2005/0198072 | A1 * | 9/2005 | Iinuma et al. | 707/104.1 |
| 2009/0254748 | A1 * | 10/2009 | Mochizuki | 713/168 |
| 2009/0313340 | A1 * | 12/2009 | Ando et al. | 709/206 |
| 2014/0108944 | A1 * | 4/2014 | Inami | 715/738 |
| 2014/0368849 | A1 * | 12/2014 | Kato et al. | 358/1.13 |
| 2015/0116755 | A1 * | 4/2015 | Hayakawa | 358/1.14 |

* cited by examiner

*Primary Examiner* — Dung Tran
(74) *Attorney, Agent, or Firm* — Patterson & Sheridan, LLP

(57) ABSTRACT

An image processing device includes a scanning unit configured convert an image of an object into image data, a storage unit storing the image data, and a controller configured to transmit an electronic message to a client computer, such that a screen of the electronic message displayed on the client computer includes a user interface element associated with deleting the image data from the storage unit.

11 Claims, 10 Drawing Sheets

FIG. 4

```
Received from MFP-001
Date : 01/20/2014 10:43
Pages : 3
Resolution : 200x200 DPI
----------------------------------------

Please download the scanned image(s) from following URL.

http://10.151.xxx.xxx/b65ffa3c8dc95db2d450dee/ScanDocs/DOC010614-
01062014144228.pdf Please delete the scanned image(s) from following URL  after downloading http://10.151.xxx.xxx/b65ffa3c8dc95db2d450dee/ScanDocs/Delete/DOC
010614-01062014144228.pdf This scanned image(s) will be deleted at 2/19/2014.
```

FIG. 6

| USER IDENTIFIER | IMAGE FILE URL | NUMBER OF DOWNLOADING TIMES |
|---|---|---|
| b65ffa3c8dc95db2d450dee | Http://10.151.xxx.xxx | 1 |
| c34er4t9rt78dn3r898erh | Http://20.578.xxx.xxx | 0 |

FIG. 7

| IMAGE FILE URL | ADDRESS OF TRANSMITTED EMAIL | To/CC/BCC |
|---|---|---|
| http://10.151.xxx.xxx | aaa@bbb.co.jp | To |
| | bbb@ccc.co.jp | CC |
| | mmm@nnn.co.jp | CC |
| | xxx@yyy.co.jp | CC |
| http://20.578.xxx.xxx | bbb@ccc.co.jp | To |
| | ddd@eee.co.jp | CC |
| | mmm@nnn.co.jp | BCC |

FIG. 8

ADDRESS OF TRANSMISSION DESTINATION

To: ☐

Cc: ☐

Bcc: ☐

FIG. 9

PLEASE DESIGNATE AUTHORIZED PERSON OF DELETION
○ ONLY RECEIVER OF To:
◉ RECEIVERS OF To: AND Cc:
○ ALL OF RECEIVERS
○ RECEIVER OF FOLLOWING ADDRESS (IT IS POSSIBLE TO SET PLURALITY OF RECEIVERS)

```
ADDRESS OF TRANSMISSION DESTINATION
To: [                    ]

Cc: [                    ]

Bcc:[                    ]

PLEASE DESIGNATE AUTHORIZED PERSON OF DELETION
○ ONLY RECEIVER OF To:
◉ RECEIVERS OF To: AND Cc:
○ ALL OF RECEIVERS
○ RECEIVER OF FOLLOWING ADDRESS (IT IS
  POSSIBLE TO SET PLURALITY OF RECEIVERS)
  [                    ]
```

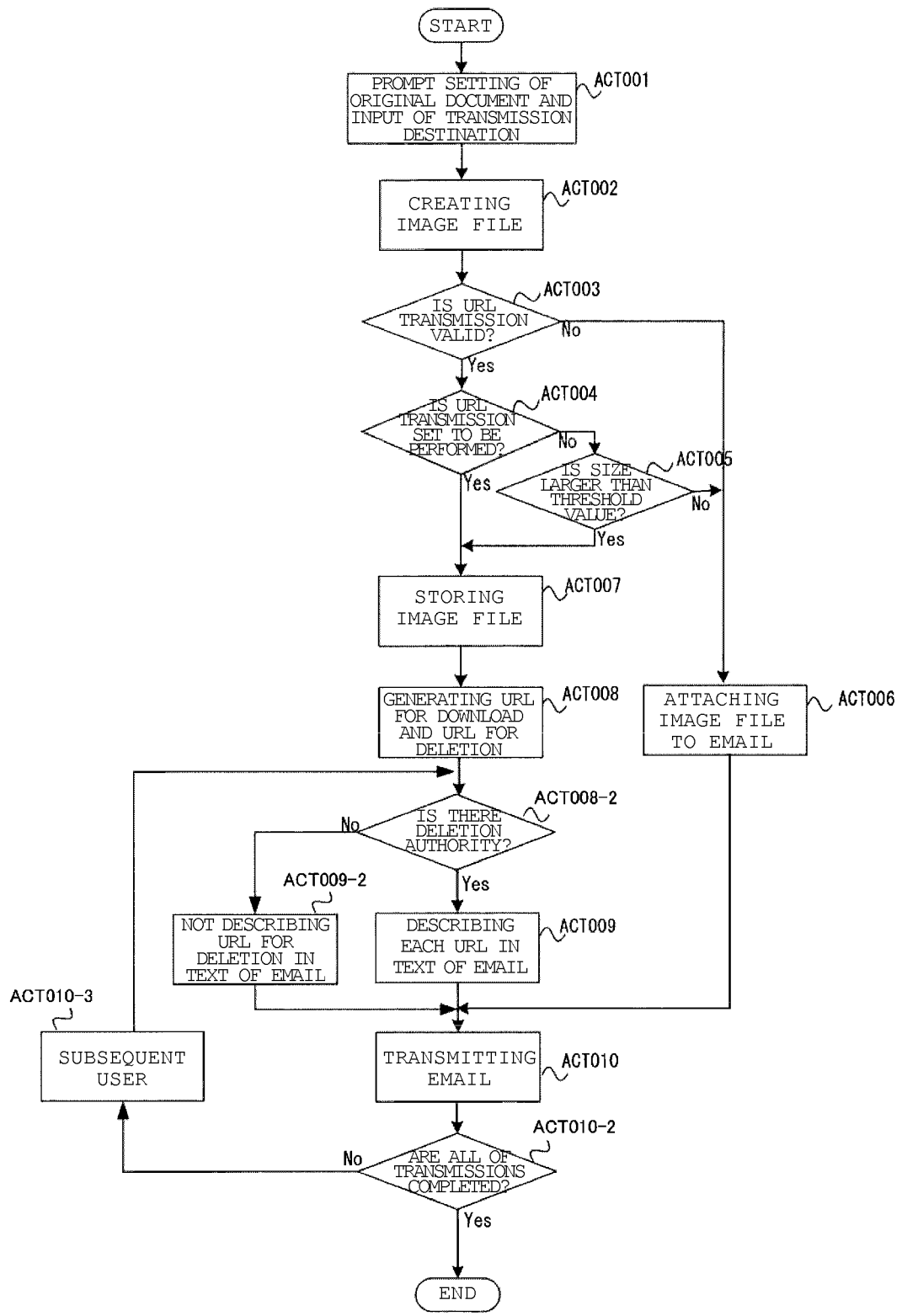

IMAGE PROCESSING DEVICE AND METHOD FOR PROCESSING IMAGE DATA

FIELD

Embodiments described herein relate generally to an image processing device and a method for processing image data.

BACKGROUND

An image processing device, such as a multifunction peripheral (MFP), includes a function of transmitting an email with image data attached thereto. Another image processing device has a function of storing image data in storage and transmitting an email including a link to a URL (Uniform Resource Locator) of the storage at which the image data is stored. A user can download the image data from the storage by accessing the link to the URL in the email.

However, according to such an image processing device, the image data remains in the storage even after the user has downloaded the image data from the storage. As the size of the remaining image data increases, an available space of the storage decreases. Further, since the image data remains in the storage, an unauthorized person may access the image file in the storage.

DESCRIPTION OF THE DRAWINGS

FIG. 4 illustrates an example of an email displayed on a display unit of a client PC in the system.

FIGS. 6 and 7 illustrate information stored in a management data base of the image processing device.

FIGS. 8-10 illustrate examples of a screen displayed on a display unit of the image processing device when an email is transmitted to a plurality of users.

FIG. 12 is a flowchart of an operation carried out by an image processing device according to a third embodiment.

DETAILED DESCRIPTION

In general, an image processing device includes a scanning unit configured convert an image of an object into image data, a storage unit storing the image data, and a controller configured to transmit an electronic message to a client computer, such that a screen of the electronic message displayed on the client computer includes a user interface element associated with deleting the image data from the storage unit.

First Embodiment

Figure 1:
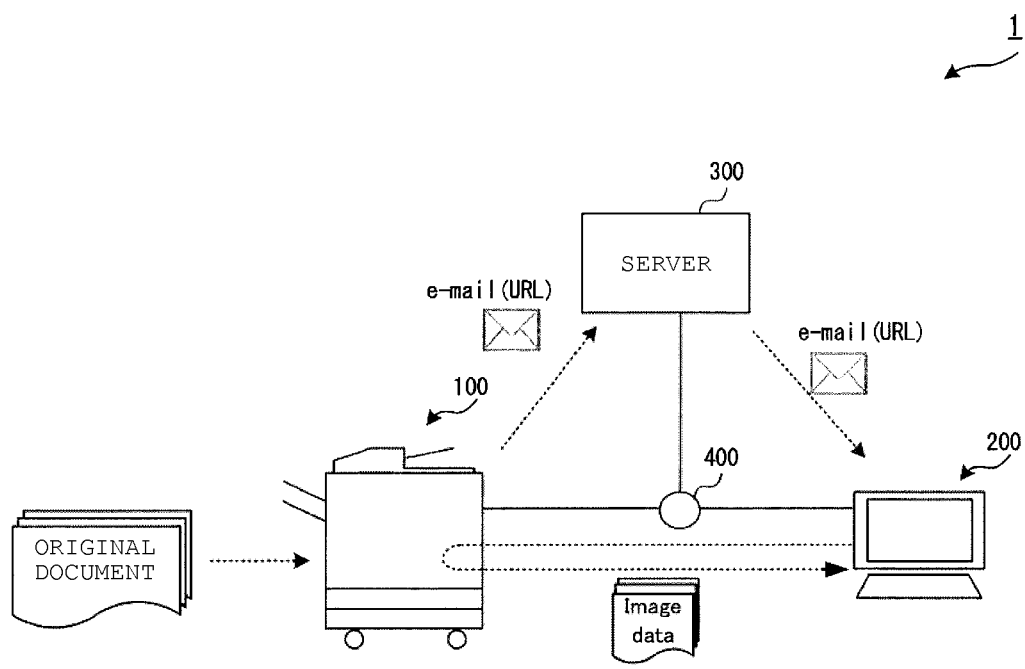
FIG. 1 is a diagram which illustrates a system including an image processing device according to an embodiment.

Hereinafter, descriptions will be made with reference to drawings. FIG. 1 illustrates an entire system including an image processing device according to an embodiment. In FIG. 1 a flow of data is shown by dotted lines. A system 1 includes an MFP 100, a client PC 200, and a server 300, and each of the units may mutually perform communication of data through a network 400.

The MFP 100 has a function of transmitting and receiving an email through a communication network (LAN or Internet). The client PC 200 is a computer which is used by a user, and to which an email application, a Web browser, or the like, is installed in advance. The server 300 is a mail server, in which a mail box of a user who uses the client PC 200 is registered in advance.

Here, an outline of an email transmission will be described based on FIG. 1. When transmitting an email, the MFP 100 prompts a user on a transmission side (i.e., a user operating the MFP 100) to set the original document, which is a transmission target, and input an email address, as a transmission destination. In addition, the MFP 100 converts an image on the original document, which is the transmission target, into image data after scanning the image, and stores the converted image data in a storage medium.

Here, the MFP 100 recognizes a size of the image data, and when the size of the image data does not exceed a predetermined size, the MFP transmits the image data as a file attached to an email to a user on the reception side through the email. The client PC 200 may look at the image of the original document by receiving the email and opening the attached file.

When the size of the scanned image data exceeds the predetermined size, a function of ScanToURL is performed. Specifically, the MFP 100 transmits a Uniform Resource Locater (URL) indicating a destination where the image data is stored by describing the URL in a text of an email, as the function of ScanToURL. The client PC 200 may obtain the image of the original document by receiving the email and accessing the URL.

Figure 2:
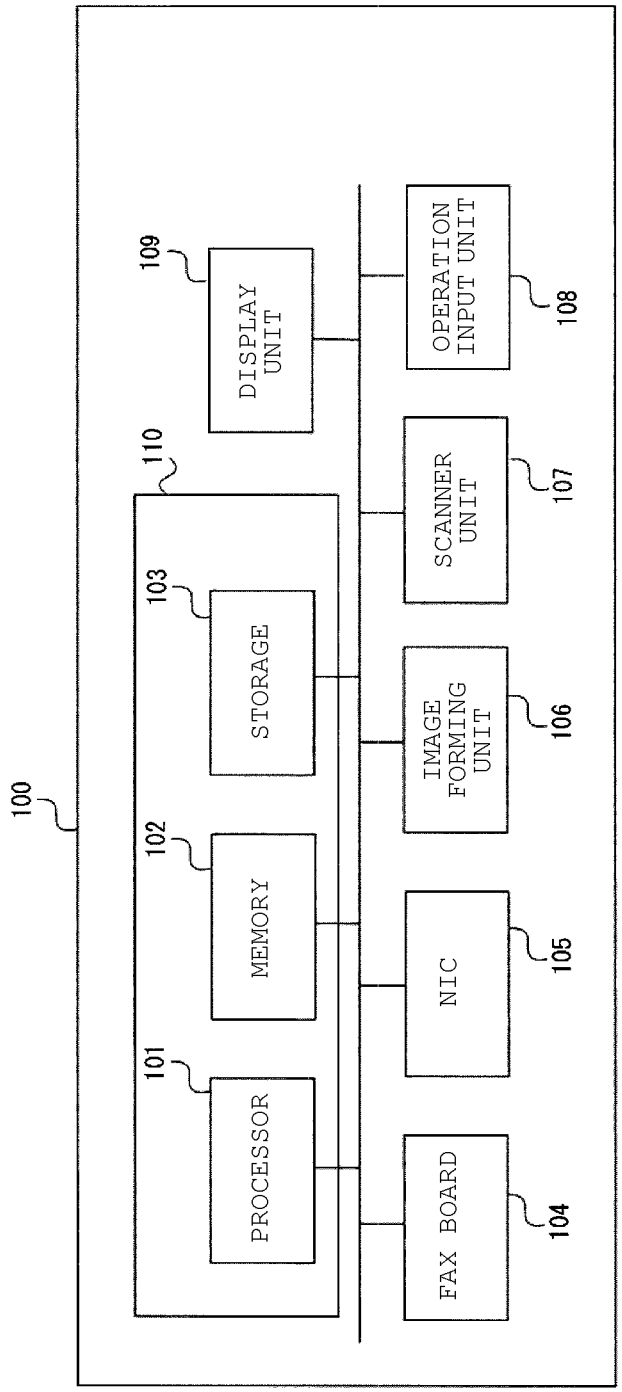
FIG. 2 is a block diagram of the image processing device.

An internal configuration of the MFP 100 will be described with reference to FIG. 2. FIG. 2 shows a multifunction peripheral (MFP) including a function of a copier and a printer, in addition to functions of transmitting an email and a facsimile; however, hereinafter, only the function of transmitting an email will be described.

The MFP 100 includes a processor 101, a memory 102, a storage 103, a fax board 104, a network card (NIC) 105, an image forming unit 106, a scanner unit 107, an operation input unit 108, and a display unit 109. A control unit 110 may consist of the processor 101, the memory 102, and the storage 103.

The processor 101 is, for example, a central processing unit (CPU), and operates and executes a program stored in the storage 103 in advance. In this manner, the processor 101 controls each unit in the MFP 100.

The memory 102 is a main storage device, which is volatile. The storage 103 is a hard disk drive, for example, and is an auxiliary storage device, which is a non-volatile storage. In the storage 103, a predetermined program, a web server program, layout data to be displayed on the web, and the like, are stored in advance.

In addition, the storage 103 stores image data which will be downloaded by a user when performing a ScanToURL transmission (described below) in a preset file format. The processor 101 manages storing, deleting, a history of downloading, or the like, of each image data stored in the storage 103 using a data base (management DB). The management DB is also stored in the storage 103.

The fax board 104 is a board for receiving or transmitting a fax through a public network, and the NIC 105 is a board using an IEEE802.3 standard. The MFP 100 performs communication of data with the server 300 and the client PC 200 through the NIC 105. The MFP 100 transmits and receives data on a LAN or the Internet through the NIC 105 after the data is subjected to a signal conversion.

The image forming unit 106 forms an image which is scanned by the scanner unit 107, or prints printing data which is transmitted from an external device (for example, client PC 200) on a sheet. The image forming unit 106 includes a process unit which transfers a toner image onto the sheet, a fixer which fixes the transferred toner image on the sheet, and the like. The scanner unit 107 scans a sheet of the original document, reads out an image on the sheet, and includes a light emitting element, an optical system such as a mirror or a lens, an imaging element, and the like.

The operation input unit 108 includes various key buttons for setting a fax number or an email address as a transmission destination and various functions of the MFP 100.

The display unit 109 includes a display panel which displays a screen indicating a state of the device, or a screen informing the user of various matters.

Figure 3:
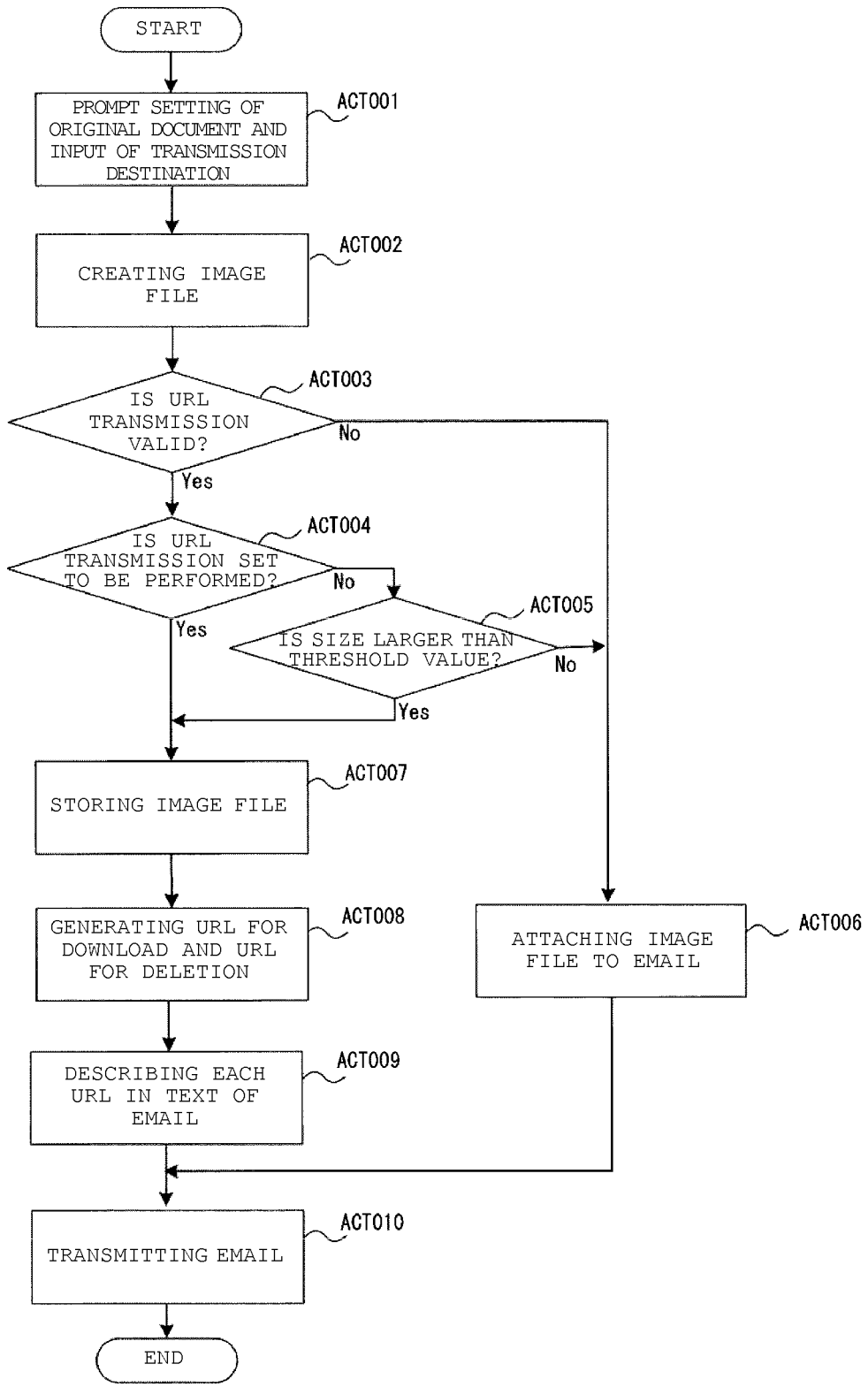
FIG. 3 is a flowchart of a transmission operation carried out by the image processing device according to a first embodiment.

FIG. 3 is a flowchart of operations carried out by the MFP 100. In the operations illustrated in FIG. 3, when a program stored in the storage 103 is developed in the memory 102, and is operated and executed by the processor 101 and hardware in the MFP 100 is operated based on the program, the operations can be achieved. In addition, at the MFP 100, a user who has an authority of an administrator can set the following items:

Validity or invalidity of a URL transmission function;

Whether or not transmission is performed using a URL every time;

Upper limit value of a file size for transmitting using URL (threshold value for not transmitting data of large size, for example, in range of 1 Mbyte to 100 Mbytes); and Image format to be converted (PDF, TIFF, XPS, or the like).

The above-described each setting is permanently stored in the storage 103, or may be changed due to a maintenance operation by an administrator.

The processor 101 causes the display unit 109 to display a screen which prompts a sender to set the original document and input an email address (ACT 001).

The sender sets the original document on a document table, which is not illustrated, inputs an email address, and presses a start key (not illustrated) of the operation input unit 108. The processor 101 controls the scanner unit 107 to scan an image on a sheet of the original document, and converts image data obtained from the scanner unit 107 into any one of the file formats of PDF, TIFF, and XPS, according to the setting set by an administrator or a selection of a user (ACT 002). The file format may be any format as long as the image file in the format may be displayed on the client PC 200. The created image file is stored in the memory 102 in this stage.

The processor 101 determines whether or not URL transmission function is valid by reading a flag value, which is stored in the storage 103 (ACT 003). When the flag value indicates that the function is invalid (No in ACT 003), the processor 101 attaches the image file to an email by converting the image data into a MIME format (ACT 006), and transmits the image file as an email attachment (ACT 010). In addition, in this case, an email without a URL for downloading and a URL for deleting in its text is transmitted.

When the URL transmission function is valid (Yes in ACT 003), the processor 101 determines whether or not to perform transmission using a URL every time, by reading the flag value stored in the storage 103 (ACT 004). When the setting if that a URL is not used every time (No in ACT 004), the processor 101 obtains a threshold value, which is stored in the storage 103, and compares the threshold value with a size of the image file which is created in ACT 002 (ACT 005). When the size of the image file is smaller than the threshold value (No in ACT 005), the processor 101 attaches the image to an email (ACT 006), and transmits the email (ACT 010).

In ACT 004, when the setting is that a URL is used every time (Yes in ACT 004), or when the size of the image file is larger than the threshold value in ACT 005 (Yes in ACT 005), the processor 101 stores the image data created in ACT 002 in the storage 103 (ACT 007). A region of the MFP 100 in which the image data is stored is a region which may be accessed from the outside of the MFP 100. In addition, when storing the image data, the processor 101 generates a character string through an encryption process, creates a folder with a name of the character string, and stores the image data with a file name which is created using a predetermined method attached thereto in the folder.

The processor 101 generates text information associated with a URL for downloading the created image file, and generates text information associated with a URL link for deleting the image file (ACT 008). At this time, an encryption process is performed with respect to a necessary portion of the descriptions of the URL. Subsequently, the processor 101 describes the text information associated with the URL for download, and the text information associated with the URL for deleting the image file, in the email (ACT 009). An example of the text information to be described is illustrated in FIG. 4. As the encrypted character string (user information, or the like) is inserted into each URL description in this manner, a person who does not obtain the URL through the email is not able to easily access the image file.

After the process in ACT 009, the processor 101 transmits the email to the server 300 through the NIC 105 (ACT 010). When transmitting the email, the processor 101 records in the management DB of the storage 103 information for identifying a user of the transmission destination, information for identifying the image file, and information indicating that the number of downloading times is zero, so that these pieces of information are correlated with each other (refer to FIG. 6).

FIG. 6 illustrates a part of data structure of the management DB. A user identifier of a user of a transmission destination, information indicating an image file, which is a downloading target and a deletion target (URL which is image file storage destination), and information indicating the number of downloading times of the image file by the user of the transmission destination are recorded in association with each other. In addition to this, various pieces of information are recorded in the management DB, and are correlated with each other with respect to each user identifier or each image file URL.

A user operates the client PC 200 and receives an email from the server 300. When an image file is attached to an email, the user confirms an image by opening the image file. In addition, when a URL for downloading an image file is described in a text of an email, by selecting the URL (includes clicking operation), the client PC 200 displays the image after a web browser is started up and may store the image therein by downloading the image as necessary. At this time, the processor 101 of the MFP 100 starts up a web server program, and responds to the access from the client PC 200.

The processor 101 of the MFP 100 confirms that the image file is properly downloaded using the PC 200, and deletes the image file thereafter when the processor 101 confirmed that the user selects a URL for deleting the image file.

Next, the URL for downloading the image file and the URL for deleting the image file, both of which are described in a text of a mail, will be described in detail with reference to FIG. 4. In FIG. 4, the URL for download is in a format of "http://storage location of image file/encrypted information/ folder name/file name-property information.ext." In addition, the URL for deletion is in a format of "http://storage location of image file/encrypted information/folder name/deletion instruction/file name-property information.ext."

In the above descriptions, it is possible to include various information related to a user in the encrypted information. As an example, a case in which an email address of a user of the transmission destination is encrypted (hashed) as encrypted information is described will be described. In addition, various kinds of information related to an image file, such as a created date and time of an image file, the number of images, and a capacity and resolution of the image, may be included in the property information. In addition, it is possible to describe the property information using encryption to enhance security.

When such an email is received by the PC 200 and the user selects the URL in the mail text by operating the PC 200, a communication with the MFP 100 is established, various pieces of information of the URL are transmitted to the MFP 100, and each process which will be described later is performed by the MFP 100.

In addition, as illustrated in FIG. 4, a name of a transmission origin (MFP-001 on the first row), a date and time of transmission and reception, the number of pages (number of images), and resolution may be described in the mail text.

In addition, as shown on the last row in FIG. 4, a deletion date of the image file on which the image file is automatically deleted may be provided in order to notify the receiver of the deletion date. The deletion of the image file can secure a storage capacity of the storage 103 of the MFP 100. In the automatic deletion process, the MFP 100 forcibly delete the image file at a regulated time (for example, 0:00) of the deletion date described in the mail text.

When a user selects the URL for deletion, the MFP 100 deletes the corresponding image file, even when it is earlier than the regulated time of the deletion date described in the mail text.

These operations will be described with reference to the flowchart in FIG. 5. The processor 101 refers to a created date and time of an image file (ACT 101), and determines whether or not the date and time passes a period which is defined in advance (for example, period designated in range of 1 day to 99 days) (ACT 102).

Here, the processor 101 deletes the entire folder including the image file of which defined period has passed (Yes in ACT 102, and ACT 109). On the other hand, when the image file is a file of which defined period has not passed yet (No in ACT 102), whether or not the URL for deletion is selected with respect to the image file is determined (ACT 103), and a passage of the defined period and a selection of the URL for deletion are monitored until the URL for deletion is selected (No in ACT 103, and ACTs 101 to 103).

In the meantime, when a user selects the URL for downloading the image file described in the mail text which is displayed on the display screen of the PC 200, a communication is established between the PC 200 and the MFP 100, and each piece of information corresponding to the URL for download is transmitted to the MFP 100. At this time, the processor 101 of the MFP 100 determines that the URL for download has been selected, and generates decoded data by decoding encrypted information in the received pieces of information. In addition, the processor 101 allows the PC 200 to download a corresponding image file in the MFP 100 by referring to each of the decoded data items. The method is the same as that in the related art, and detailed descriptions thereof will be omitted.

In addition, every time an image file is downloaded, the processor 101 of the MFP 100 updates data in the storage 103 so that 1 is added to the number of downloading times in the above described management DB (upper row in FIG. 6).

On the other hand, when a user selects the URL for deleting an image file in a text of a mail which is displayed on the display screen of the PC 200, a communication is established between the PC 200 and the MFP 100, and each piece of information corresponding to the URL for deletion is transmitted to the MFP 100. At this time, the processor 101 of the MFP 100 determines that the URL for deletion has been selected, and generates decoded data by decoding encrypted information in the received pieces of information. Then, the processor 101 executes an image file deletion script which is generated in the MFP 100 by referring to each of the decoded data items (Yes in ACT 103, and ACT 104 and after ACT 104).

The processor 101 performs a process of collating between each data received from the PC 200 and data stored in the MFP 100, and determines whether or not each pair of information matches each other (ACT 104 and ACT 105). For example, in the collating and determining, a folder name and a file name which are received from the PC 200, and a date and time of creating the file included in property information are compared to a folder name and a file name and a date and time of creating the file which are stored in the MFP 100, and whether or not the respective pieces of information match is determined.

Here, when it is determined that at least one pair of information does not match each other, (No in ACT 105), the processor 101 does not perform deletion of the image file. In other words, a process of deleting the corresponding image file is prohibited. At this time, the processor 101 sends an instruction to the PC 200 so that a browser screen for informing of the fact that the image file is not deleted due to a collation error is displayed on the display unit 109, and ends the process (ACT 106).

The case in which at least one pair of information does not match each other may happen, for example, when data stored in the MFP 100 is damaged, when the URL for deletion has been previously accessed and the image file is no longer in the MFP 100, or the like.

On the other hand, when it is determined that the respective pairs of information match each other (Yes in ACT 105), the processor 101 determines whether or not the image file has been already downloaded by the user (ACT 107). The determination may be performed by referring to downloading history data (number of downloading times in FIG. 6) in the management DB.

Here, when it is determined that the image file has not been downloaded yet (No in ACT 107), the processor 101 sends an instruction to the PC 200 so that a browser screen for informing that the image file has not been downloaded yet even once, and that the image file, accordingly, is not deleted, is displayed on the display unit 109, and ends the process (ACT 108).

By performing such a process, the image file is not deleted, when a user selects the URL for deletion earlier than the URL for download by mistake. Accordingly, a user can download the image file thereafter.

On the other hand, when it is determined that the image file has been already downloaded by the user (Yes in ACT 107), the processor 101 deletes a corresponding image file in each folder (ACT 109). At this time, the processor 101 may send an instruction to the PC 200 so that a browser screen for informing that the image file has been properly deleted is displayed on the display unit 109. In addition, at this time, it is also possible to appropriately delete data which is not necessary to leave as a record, from the various data items in the management DB.

Second Embodiment

In the first embodiment, basically, the image file is transmitted through an email to a single user, and is downloaded by the user. In a second embodiment, the image file is transmitted through an email to a plurality of users, or is downloaded by the plurality of users. Here, descriptions of the same portion as that of the first embodiment will be omitted.

According to the second embodiment, an example of a screen which is displayed on a display unit 109 when a transmission destination is input in ACT 001 is illustrated in FIG. 8. In the example, it is possible to input an email address of the transmission destination into one or more sections of "To:," "Cc:," and "Bcc:," and it is possible to designate a plurality of email addresses in any section of the "To:," "Cc:," and "Bcc:."

When the image file is transmitted using URL descriptions, not as an attachment file to an email, after input of an email address of the transmission destination and processes of ACT 002 to ACT 005, a screen for designating an authorized person of deletion is displayed when the image file is stored in ACT 007. At this time, an example of a screen which is displayed on the display unit 109 of the MFP 100 is illustrated in FIG. 9. FIG. 9, shows the screen for designating (setting) the authorized person of deletion that is displayed on the display unit 109.

On the screen, as a method of designating the authorized person of deletion, one of the following can be selected:
1. "only receiver of To:";
2. "receivers of To: and Cc:";
3. "all of receivers"; and
4. "receiver of designated email address".
When "4." is selected, one or more email addresses can be further input to the section.

A designating method of "4." Can be preferably selected when the authorized users do not correspond to any of "1." to "3.", for example, when the deletion authority should be provided only to a person with a specific address among a plurality of addresses input to "Bcc:."

In addition, as an example of another display screen which is displayed in ACT 007, the above described display contents in FIGS. 8 and 9 may be displayed on one screen as illustrated in FIG. 10, in order to make the address of the transmission destination be appropriately changed based on the authority setting. That is, in the example in FIG. 10, the email address of the transmission destination is input to one or more sections of "To:," "Cc:," and "Bcc:," and a single screen for designating the authorized person of deletion is displayed on the display unit.

When the designation of the authorized person of deletion is performed through the screen in FIG. 9 or 10, processes of ACTs 008 and 009 are performed similarly to the first embodiment. In ACT 010, an email in which both the above described URL for download and URL for deletion are described in a mail text is created for each email address, which is the transmission destination, and is transmitted to each designated user address (refer to FIG. 4).

Here, descriptions of encrypted information in the URL for download and the URL for deletion, which indicates the user, are different for each user of the transmission destination. This difference is based on that the email address is different for each user. In addition, when an email is transmitted in ACT 010, the processor 101 records data for each user, which is described in FIG. 6, and management data for each image file, which is described in FIG. 7, in the management DB.

In FIG. 7, information which identifies an image file (image file URL), user identification information (transmission destinations) of a plurality of users who download the image file (transmission email address), and information indicating which one of "To:", "Cc:", and "Bcc:" each user belongs to are correlated with each other in the management DB. In addition, when"4" is selected, or even when "1"-"3" are selected, it is possible to register information indicating whether or not each user has a deletion authority by correlating such information with the user identification information in advance.

Figure 5:
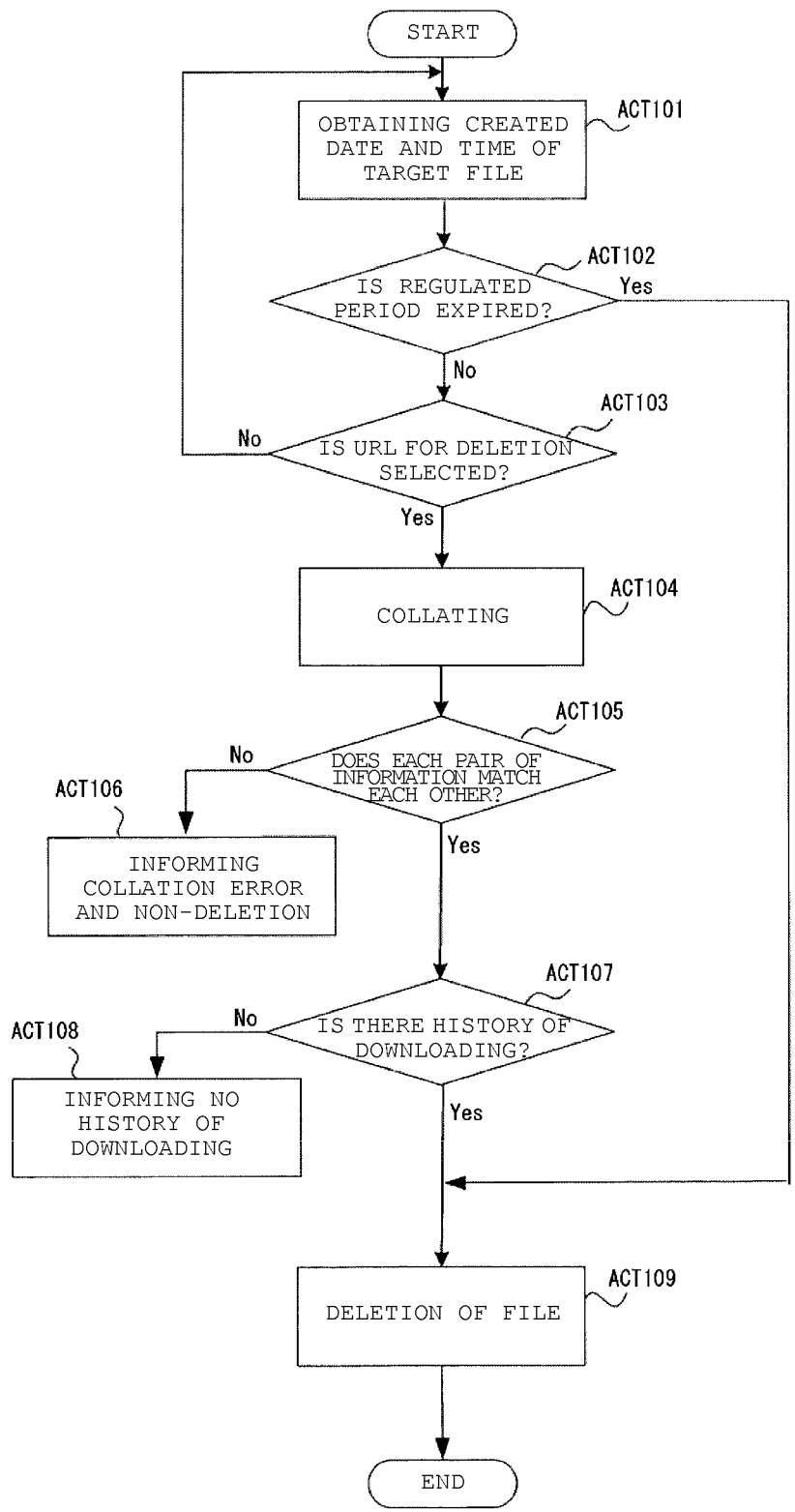
FIG. 5 is a flowchart of a deletion operation carried out by the image processing device according to the first embodiment.
Figure 11:
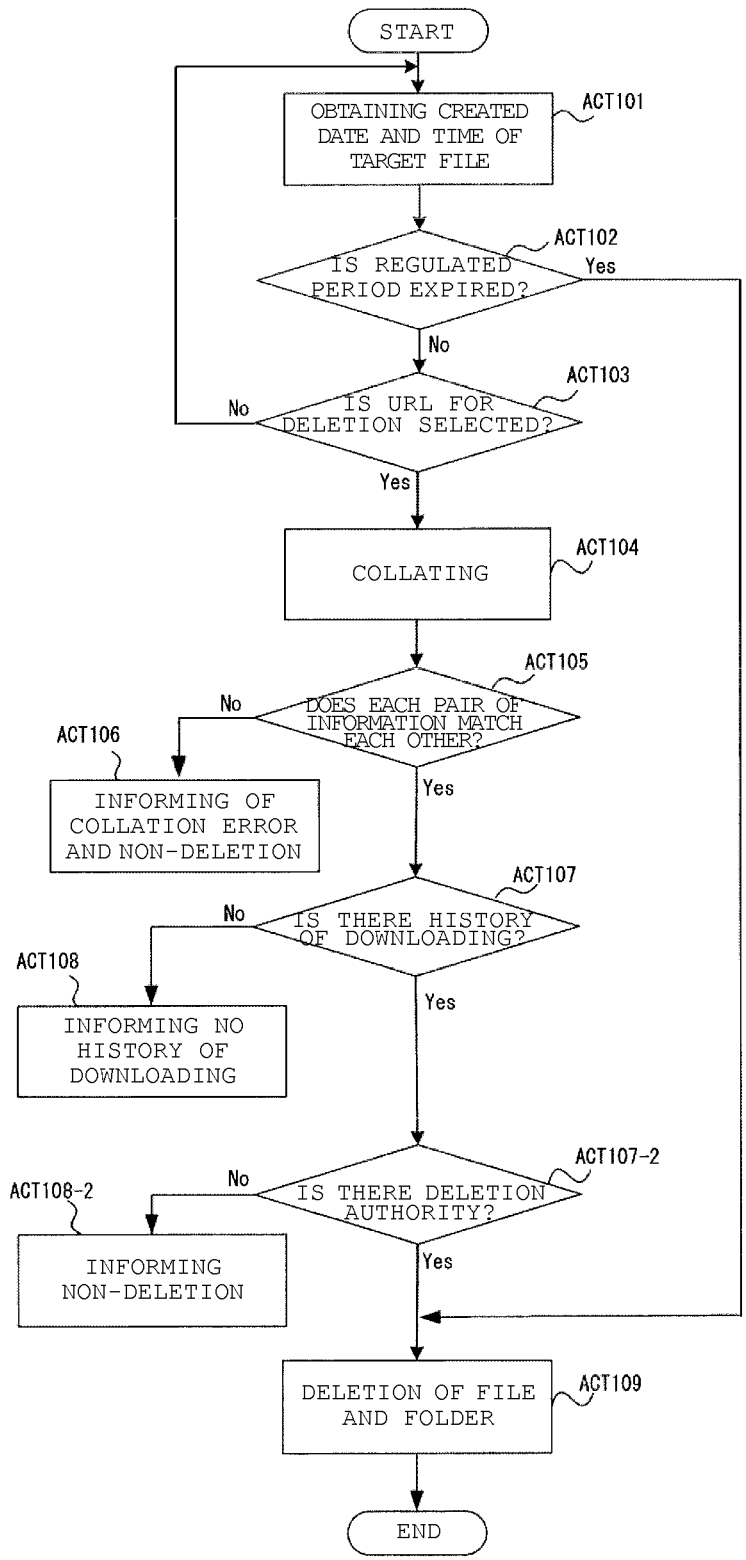
FIG. 11 is a flowchart of an operation carried out by an image processing device according to a second embodiment.

A flowchart of the second embodiment corresponding to the flowchart of the first embodiment shown in FIG. 5 is illustrated in FIG. 11. According to the second embodiment, processes of ACT 107-2 and ACT 108-2 are added between a determination in ACT 107 and a deleting process in ACT 109, and other processes are the same as those in FIG. 5.

When it is determined that the image data has been already downloaded by the user in ACT 107 (Yes in ACT 107), the processor 101 performs a determination of ACT 107-2 before deleting a corresponding image file. Here, the processor 101 determines whether or not the user (that is, user who selects URL for deletion) has the deletion authority with reference to the management DB.

At this time, when it is determined that the user has the deletion authority (Yes in ACT 107-2), the processor 101 deletes the entire folder including the corresponding image file, similarly to the first embodiment (ACT 109).

On the other hand, when it is determined that the user does not have the deletion authority (No in ACT 107-2), the processor 101 sends an instruction to the PC 200 so that a browser screen for informing that the image file is not deleted since the user does not have the deletion authority is displayed on the display unit 109, and ends the process (ACT 108-2).

By performing such a process, a person who sends an email can give a deletion authority to one or more specific persons, and only the person who has the deletion authority can delete the image file.

Third Embodiment

In the second embodiment, an email including the URL for download and the URL for deletion of image data in the text is transmitted to a plurality of users. According to a third embodiment, an email without the URL for deletion of image data is transmitted to a person who does not have a deletion authority is transmitted, while an email including the image file is transmitted to a plurality of users. Descriptions of the same portion as that of the first embodiment or the second embodiment will be omitted.

In the third embodiment, designations of an address as a transmission destination and an authorized person of deletion are performed similarly to the second embodiment (ACT 001 in FIG. 3, and FIGS. 8 to 10).

On the other hand, the processor 101 performs the following processes related to creation and transmission of an email with respect to each user. Here, FIG. 12 is a flowchart related to a transmission of an email in the third embodiment, and processes of ACT 008-2, ACT 009-2, ACT 010-2, and ACT 010-3 are included.

In ACT 008, as described above, the processor 101 generates a deletion script including text information which indicates a URL for downloading the created image file, and a URL for deleting the image file.

In ACT 008-2, the processor 101 determines whether or not a deletion authority of an image file is given to one predetermined user (for example, user who is firstly described in "To:"). Here, when it is determined that the deletion authority is given (Yes in ACT 008-2), the processor 101 creates an email in which two URLs, i.e., the URL for download and the URL for deletion, are described in a mail text, and transmits the email to the user (ACT 009, and ACT 010). On the other hand, when it is determined that the deletion authority is not given (No in ACT 008-2), the processor 101 creates an email in which the URL for deletion is not described in the mail text, and transmits the email to the user (ACT 009-2 and ACT 010).

When the email is transmitted, the processor 101 determines whether or not the transmission to all of the designated users is completed (ACT 010-2). Here, when it is determined that the transmission to all of the users is not completed (No in ACT 010-2), the processor 101 refers to information of the subsequent one user (for example, second user in "To:", or user who is described in "Cc:", or "Bcc:") (ACT 010-3), returns to ACT 008-2 thereafter, and repeats routines after ACT 008-2 until the email transmission to all of the users is completed.

When the email transmission to all of the users is completed (Yes in ACT 010-2), the processor 101 ends the series of processes.

In this manner, according to the third embodiment, since the URL for deletion is not described in a mail text of an email sent to a user who does not have the deletion authority of an image file, it is possible to prevent the user without the deletion authority from performing the deletion operation.

In the above described embodiments, both the URL for download and the URL for deletion of image data are described in a mail text of one email. As a modification example, an email having the URL for download of image file in the mail text (first email) and an email having the URL for deletion of the image file in the mail text (second email) may be separately transmitted with a time lag. In this case, it is preferable that the processor 101 of the MFP 100 transmits the former email first, and then the latter email. In addition, the processor 101 may transmit the second mail to the user after the processor 101 confirms that the user performed downloading of the image data, after transmitting the first email.

In addition, in the above described each example, the two objects for downloading and deletion are described (disposed) in forms of URL in a mail text of an email; however, as a modification example of these objects, icons for the download and the deletion of image data may be included in a mail text, instead. In this case, it is also possible to transmit the same information to the MFP 100 in response to the user's clicking the icons. Moreover, it is possible to make information which is visibly attached to the icons (that is, information displayed on display unit of client PC 200) small.

According to the above described embodiments and modification examples, a user on the reception side is also provided with an authority of deleting an image file through an object for deletion which is included in a mail text so as to be selected and operated, in addition to an authority of downloading the image file. Accordingly, when the user selects the object for deletion through an operation of clicking a mouse, or the like, the image file is deleted before the time for automatic deletion, and it is possible to preserve a space of a storage device and increase a security risk.

In addition, in each of the above described embodiments and modification examples, the MFP is described as the image processing device; however, they are able to be applied to a facsimile machine which is connected to a communication network.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image processing device comprising:
a scanning unit configured to convert an image of an object into image data;
a storage unit storing the image data; and
a controller configured to
receive authority information about one or more users who are authorized to delete the image data from the storage unit,
control the storage unit to store the authority information in association with the image data,
transmit an electronic message to a client computer, such that a screen of the electronic message displayed on the client computer includes a user interface element associated with deleting the image data from the storage unit,
receive a command to delete the image data from the storage unit in response to an operation of the user interface element on the client computer,
receive, from the client computer, user identification information along with the command, and
delete the image data from the storage unit when a user identified by the user identification information is an authorized user according to the authority information.

2. The image processing device according to claim 1, wherein
the storage unit further stores download information indicating whether or not the image data has been downloaded to a client computer, and
the controller is further configured to,
in response to receiving the command to delete the image data:
determine whether the download information indicates that the image data has been downloaded, and
prevent the image data from being deleted if the download information does not indicate that the image data has been downloaded, and delete the image data if the download information indicates that the image data has been downloaded.

3. The image processing device according to claim 1, wherein the controller is further configured to:
transmit an electronic message from the image processing device to a client computer associated with a user who is not authorized to delete the image data, such that a screen of the electronic message displayed on the client computer of the unauthorized user does not include the user interface element.

4. The image processing device according to claim 1, wherein
the screen of the electronic message displayed on the client computer also includes a user interface element associated with downloading the image data from the storage unit to the client computer.

5. A method for processing image data, comprising:
converting an image of an object into image data at an image processing device;
storing the image data in a storage unit;
receiving authority information about one or more users who are authorized to delete the image data from the storage unit;
transmitting an electronic message from the image processing device to a client computer, such that a screen of the electronic message displayed on the client computer includes a user interface element associated with deleting the image data from the storage unit;
receiving a command to delete the image data from the storage unit in response to an operation of the user interface element on the client computer;
receiving, from the client computer, user identification information along with the command; and
deleting the image data from the storage unit when a user identified by the user identification information is an authorized user according to the authority information.

6. The method according to claim 5, further comprising:
storing in the storage unit download information indicating whether or not the image data has been downloaded to a client computer; and
in response to receiving the command to delete the image data:
determining whether the download information indicates that the image data has been downloaded, and
preventing the image data from being deleted if the download information does not indicate that the image data has been downloaded, and deleting the image data if the download information indicates that the image data has been downloaded.

7. The method according to claim 5, further comprising:
transmitting an electronic message from the image processing device to a client computer associated with a user who is not authorized to delete the image data, such that a screen of the electronic message displayed on the client computer of the unauthorized user does not include the user interface element.

8. The method according to claim 5, wherein
the screen of the electronic message displayed on the client computer also includes a user interface element associated with downloading the image data from the storage unit to the client computer.

9. A non-transitory computer readable medium comprising a program that is executable in a computing device to cause the computing device to perform a method for processing image data, the method comprising:
converting an image of an object into image data at a computing device;
storing the image data in a storage;
receiving authority information about one or more users who are authorized to delete the image data from the storage unit;
transmitting an electronic message from the image processing device to a client computer, such that a screen of the electronic message displayed on the client computer includes a user interface element associated with deleting the image data from the storage;
receiving a command to delete the image data from the storage unit in response to an operation of the user interface element on the client computer;
receiving, from the client computer, user identification information along with the command; and
deleting the image data from the storage unit when a user identified by the user identification information is an authorized user according to the authority information.

10. The non-transitory computer readable medium according to claim 9, wherein the method further comprises:
storing in the storage unit download information indicating whether or not the image data has been downloaded to a client computer; and
in response to receiving the command to delete the image data:
determining whether the download information indicates that the image data has been downloaded, and
prevent the image data from being deleted if the download information does not indicate that the image data has been downloaded, and deleting the image data if the download information indicates that the image data has been downloaded.

11. The non-transitory computer readable medium according to claim 9, wherein the method further comprises:
transmitting an electronic message from the image processing device towards a client computer associated with a user who is not authorized to delete the image data, such that a screen of the electronic message displayed on the client computer of the unauthorized user does not includes the user interface element.

* * * * *